(12) United States Patent
Park

(10) Patent No.: US 7,502,949 B2
(45) Date of Patent: Mar. 10, 2009

(54) DATA CABLE FOR AUTOMATICALLY DETECTING POWER SOURCE WITH CHARGER INTEGRATED CIRCUIT

(75) Inventor: Yoon Park, Seoul-si (KR)

(73) Assignee: PN Telecom Co., Ltd., Sangdaewon-Dong, Jungwon-Gu, Seongnam-Si, Gyeonggi-Do (KR)

( * ) Notice: Subject to any disclaimer, the term of this patent is extended or adjusted under 35 U.S.C. 154(b) by 574 days.

(21) Appl. No.: 11/344,885

(22) Filed: Feb. 1, 2006

(65) Prior Publication Data

US 2007/0024239 A1    Feb. 1, 2007

(51) Int. Cl.
G06F 1/00 (2006.01)
H02J 7/00 (2006.01)

(52) U.S. Cl. .................. 713/300; 320/110; 320/114

(58) Field of Classification Search .................. 713/300; 320/110, 114
See application file for complete search history.

(56) References Cited

U.S. PATENT DOCUMENTS

| | | | |
|---|---|---|---|
| 6,184,652 B1 * | 2/2001 | Yang | 320/110 |
| 6,362,610 B1 | 3/2002 | Yang | 323/281 |
| 6,531,845 B2 * | 3/2003 | Kerai et al. | 320/107 |
| 6,633,932 B1 * | 10/2003 | Bork et al. | 710/72 |
| 6,833,686 B2 * | 12/2004 | Veselic et al. | 320/128 |
| 6,946,817 B2 * | 9/2005 | Fischer et al. | 320/132 |
| 6,977,486 B2 * | 12/2005 | Choi | 320/149 |
| 7,360,004 B2 * | 4/2008 | Dougherty et al. | 710/303 |
| 2004/0164708 A1 * | 8/2004 | Veselic et al. | 320/132 |

FOREIGN PATENT DOCUMENTS

| | | |
|---|---|---|
| KR | 2002-33281 | 5/2002 |
| KR | 2003-58745 | 7/2003 |

* cited by examiner

*Primary Examiner*—Chun Cao
(74) *Attorney, Agent, or Firm*—Cha & Reiter, LLC

(57) ABSTRACT

A data communication cable for automatically recognizing a power-supply source is disclosed. The cable includes a USB (Universal Serial Bus) port and a data port to perform a data communication between a terminal and a personal computer (PC) and provides the terminal with a charge current, so that a power-supply source is automatically recognized and adjusted to stably perform a charge operation while minimizing the number of overload occurrences and the number of faulty charging operations.

1 Claim, 3 Drawing Sheets

DATA CABLE FOR AUTOMATICALLY DETECTING POWER SOURCE WITH CHARGER INTEGRATED CIRCUIT

This application makes reference to and claims all benefits from an application entitled DATA CABLE FOR DETECTING POWER SOURCE AUTOMATICALLY filed in the Korean Intellectual Property Office on Aug. 1, 2003 and there duly assigned Serial No. 24982/2003 and PCT/KR04/001910 filed on Jul. 29, 2004.

The present invention relates to a data communication cable for use in a mobile communication device, etc., and more particularly to a charge-type data communication cable for automatically recognizing a power-supply source, which automatically recognizes a power-supply source connected to a chargeable data cable, adjusts a charge current in response to the recognized power-supply source, and minimizes the number of overload occurrences and the number of faulty charging operations, such that it can stably perform a charging operation.

In general, communication ports for use in data transmission are classified into a USB (Universal Serial Bus) and a UART (Universal Asynchronous Receiver Transmitter), etc. The USB is indicative of a peripheral-device access interface standard proposed by seven companies including IBM Corporation, and is adapted as a common interface for simultaneously connecting a plurality of peripheral devices to a personal computer (PC).

When connecting the peripheral devices and others to the PC, the USB port can connect the PC to most peripheral devices without additionally establishing software or hardware. Therefore, the USB port can greatly reduce the number of ports, and can provide a user with greater convenience of installation, resulting in a small-sized mobile computer.

The aforementioned USB port provides a power-supply source needed to operate such peripheral devices so as to allow the peripheral devices to be operated without using an additional power-supply source. For example, the USB port provides the peripheral devices with a power-supply source of 5V/500 mA.

With the increasing development of mobile communication devices and others, many more mobile communication devices are currently interoperable with peripheral devices such as PCs whereas they have been widely used as only single devices, so that the mobile communication devices interoperable with the peripheral devices have become increasingly popular as new mobile communication devices. Therefore, a USB communication scheme is widely used as a communication means required for the new mobile communication devices, and USB share-type cables, which are capable of performing a communication service simultaneously with charging batteries of the mobile communication devices using a power-supply source provided from the USB communication scheme, are also widely used.

However, when performing the charging operation simultaneously with performing USB communication between a PC and a terminal using the aforementioned USB charge-type cables, the USB charge-type cable is able to charge a low-capacity battery having battery capacity below 500 mA on the condition that a battery of the terminal is determined to be the low-capacity battery, but it has difficulty in charging other batteries, each of which has battery capacity of more than 500 mA, due to insufficient current capacity.

Also, if the USB port uses a current of more than 500 mA, there arises overload in the USB port, such that a communication disable state unexpectedly occurs, and the PC stops its operation or is rebooted due to the occurrence of an error.

Therefore, a user must prepare not only an additional charger but also a cable required for an additional charging operation to charge a large-capacity battery, resulting in greater inconvenience of use.

The present invention has been made in view of the above problems, and it is an object of the present invention to provide a charge-type data communication cable for automatically recognizing a power-supply source, which automatically recognizes a power-supply source connected to a charge-type data cable to overcome a limitation in chargeable capacity, such that it prevents overload and faulty charging operations of a battery from being generated and at the same time performs a stable charging operation, regardless of a variation in battery capacity.

In accordance with an aspect of the present invention, the above and other objects can be accomplished by the provision of a charge-type data communication cable for automatically recognizing a power-supply source, comprising: a data port for exchanging data with a terminal, and transmitting a charge current to the terminal; a USB port for transmitting data to the terminal and an external PC, and receiving a charging power-supply source from the PC or receiving a charging power-supply source from an external power-supply unit; a cable for converting the charging power-supply source received from the PC or the power-supply unit into a charge current, transmitting the charge current to the data port, and transmitting terminal data communicating with data port to the USB port; and a charger IC for automatically recognizing a power-supply source connected to the USB port, and automatically converting/adjusting the charge current.

The charge-type data communication cable for automatically recognizing a power-supply source according to the present invention smoothly performs a data communication service between a USB port and a data port, controls a charger IC (Integrated Circuit) to automatically recognize a power-supply source received via the USB port, and outputs an optimum charge current to the data port, resulting in a stable charging operation.

The above and other objects, features and other advantages of the present invention will be more clearly understood from the following detailed description taken in conjunction with the accompanying drawings, in which.

Now, preferred embodiments of the charge-type data communication cable for automatically recognizing a power-supply source according to the present will be described in detail with reference to the annexed drawings.

Figure 1:
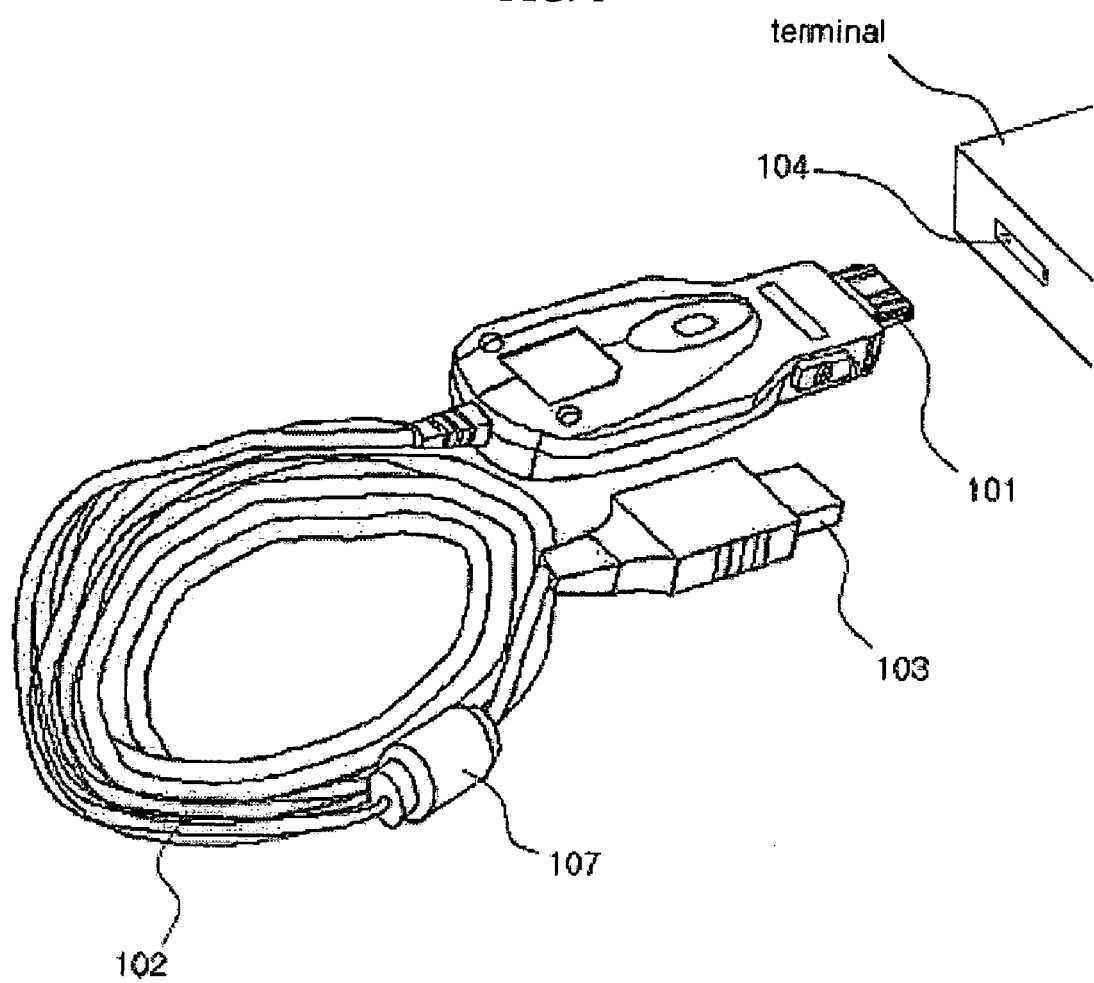
FIG. 1 is a view illustrating the appearance of a charge-type data communication cable for automatically recognizing a power-supply source in accordance with the present invention.

FIG. 1 is a view illustrating the appearance of a charge-type data communication cable for automatically recognizing a power-supply source in accordance with the present invention. Referring to FIG. 1, a cable 102 and a charging circuit 107 are connected between a data port 101 and a USB port 103.

The data port 101 transmits or receives data to/from a terminal indicative of a mobile phone over an I/O (Input/Output) port 104, and provides the terminal with a charge current. In this case, a 24-pin connector authenticated by the Telecommunication Technology Association (TTA) may generally be used as an exemplary connector for connecting the I/O port 104 to the data port 101.

The USB port 103 transmits terminal data received via the data port 101 to an external USB port 105 contained in a personal computer (PC) (not shown), receives a charging power-supply source from PC, or receives a charging power-supply source from an external power-supply unit 106 generally called an adapter. The present invention includes the cable 102 for connecting the data port 101 to the USB port 103, such that data and a power-supply signal are communicated between the data port 101 and the USB port 103. The present invention receives data from the terminal over the data port 101 connected to the mobile phone I/O port 104, transmits the data to the external USB port 105 of the PC connected to the USB port 103 over the cable 102, or receives a charging power-supply source from the external USB port 105 of the PC, such that it transmits a charge current to the terminal over the data port 101.

In the case where the charging circuit 107 is connected to the data port 101, it is also connected to the external power-supply unit 106 over the USB port 103 so as to perform a normal charging operation, and transmits a charge current to the terminal, it automatically recognizes the charge current, converts/adjusts the charge current in response to currently-used power-supply source and battery capacity, minimizes the number of overload occurrences and the number of faulty charging operations, and thereby stably performs a charging function.

Figure 2:
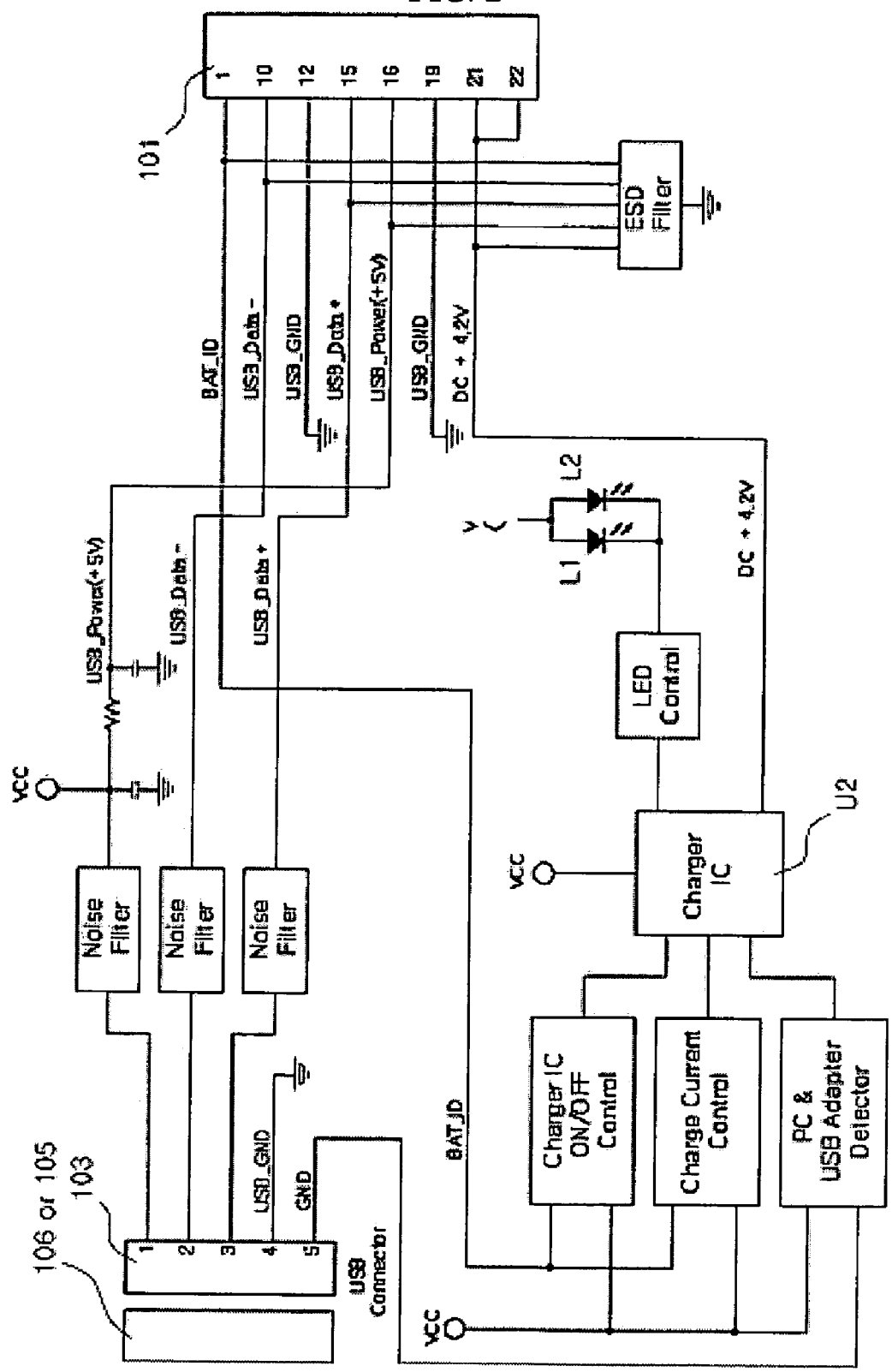
FIG. 2 is a block diagram illustrating a charge-type data communication cable for automatically recognizing a power-supply source in accordance with the present invention.

FIG. 2 is a block diagram illustrating a charge-type data communication cable for automatically recognizing a power source in accordance with the present invention.

As can be seen from FIG. 2, if the external USB port 105 is connected to the USB port 103 of the present invention, a power-supply line denoted by 'USB_Power' receives a DC voltage of +5V, allows the received DC voltage of +5V to pass through a π-type filter circuit in order to reduce ripples and noise, and thereby transmits a stable constant-voltage power supply to the terminal connected to the data port 101.

Figure 3:
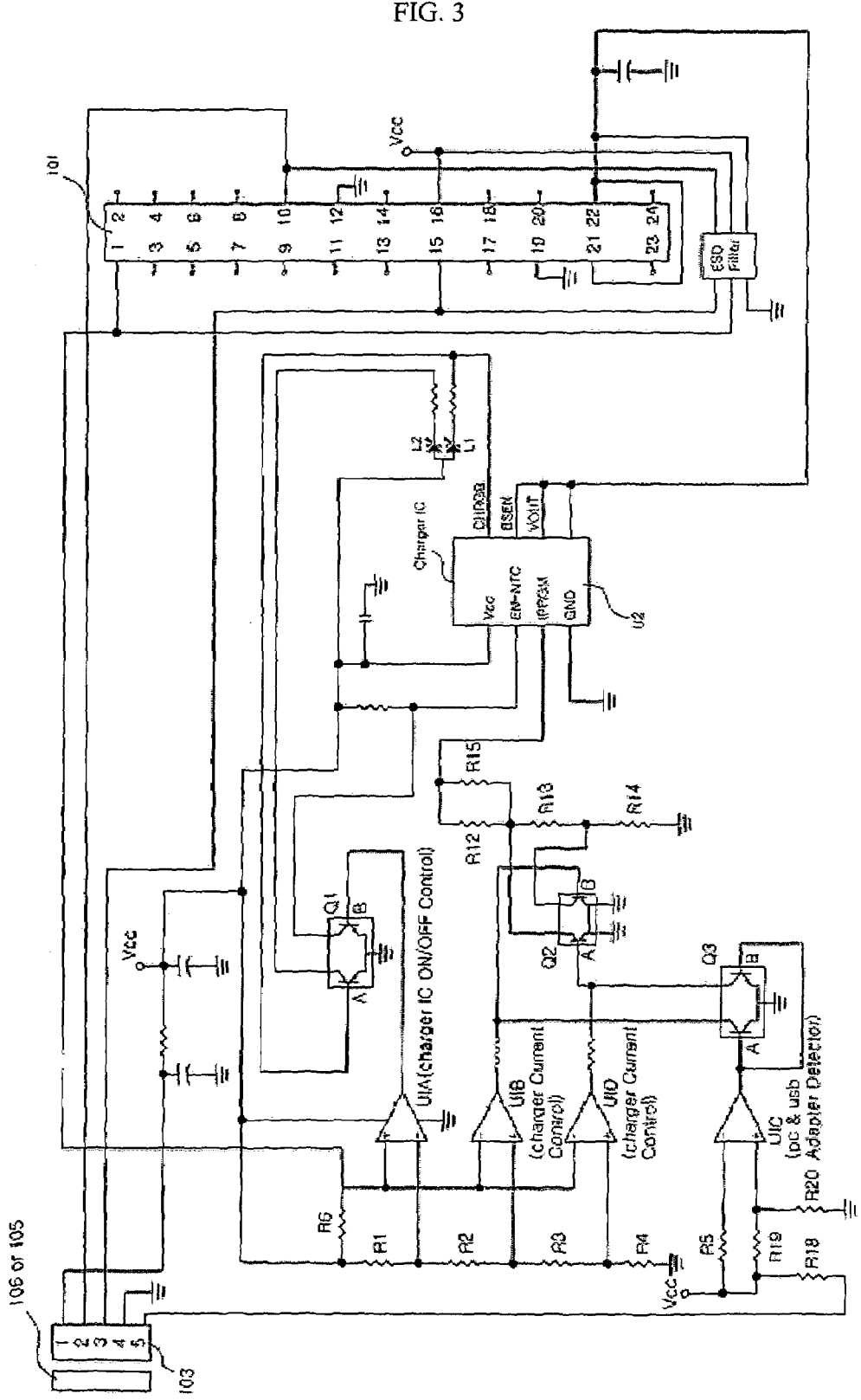
FIG. 3 is a detailed block diagram illustrating a charge-type data communication cable for automatically recognizing a power-supply source in accordance with the present invention.

Therefore, a smoothed and stable constant voltage is transmitted to the terminal over terminal over a $16^{th}$ pin of the standard 24-pin connector, the terminal determines the connection of the USB data cable, so that a current mode is switched to a USB communication mode, and a PC and a mobile phone are connected to each other over noise filters connected to USB data lines (USB Data+ and USB Data−) in such a way that data exchange between the PC and the mobile phone can be performed. If the standard 24-pin connector is connected to the terminal acting as the mobile phone as shown in FIG. 3, a battery ID voltage is applied to a non-inverting input terminal of a comparator U1A over a battery ID resistor terminal (BAT_ID), and is compared with a reference voltage of an inverting input terminal. Therefore, the voltage of the non-inverting input terminal becomes low in level when the connector and the battery are connected to each other, the low-level voltage of the non-inverting input terminal is less than the voltage of the inverting input terminal, an output level of the comparator U1A is inverted from a high-level state to a low-level state, a low-level signal is applied to a terminal B of a transistor array Q1 connected to the output terminal of the comparator UIA, one transistor of the transistor array Q1 is turned off due to the received low-level signal, and a Vcc voltage is applied to an EN-NTC terminal of a charger IC (Integrated Circuit) U2 such that the charge IC (U2) starts its operation.

Also, a battery ID resistance is applied to inverting terminals of comparators U1B and U1D, so that different voltages are applied to the inverting terminals of the comparators U1B and U1D according to the battery ID resistance, and a detailed description thereof will be provided below.

For example, the battery ID resistance can be classified into three battery ID resistances according to battery capacity, as shown in the following Table 1 showing allowable currents in response to BAT_ID:

TABLE 1

| BAT_ID resistance | Setup Current |
|---|---|
| 27 kΩ | 450 mA ± 50 mA |
| 4.5 kΩ | 750 mA ± 50 mA |
| 1.5 kΩ | 900 mA ± 50 mA |

The resistance of the battery ID resistor terminal (BAT_ID) is detected by a voltage applied according to the ID resistance after a reference voltage is applied to the input terminals of the comparators U1B and U1D. Therefore, if the resistance of the ID resistor terminal (BAT_ID) is determined to be 27 kΩ, this determined resistance is a high resistance, a value of the inverting input terminal becomes high in level, and output levels of the comparators U1B and U1D become low in level, so that a transistor array Q2 is turned off. Therefore, resistors R12 and R15 are connected in parallel between an IPRGM terminal (see 'SC802 chip' of SEMTECH Corporation) and a ground terminal of the charger IC (U2), resistors R13 and R14 are connected in series to the resistors R12 and R15, the highest resistance is loaded between the IPRGM terminal and the ground terminal, and thereby the charger IC (U2) outputs a predetermined constant voltage of 4.2V/450 mA in response to the highest resistance.

As a result, a small-capacity battery can be normally charged with electricity without any problem. If the resistance of the ID resistor terminal (BAT_ID) is determined to be 4.5 kΩ, each input voltage of the comparators U1B and U1D is lower than that of the aforementioned case in which the resistance of the ID resistor terminal (BAT_ID) is equal to 27 kΩ, so that the output level of the comparator U1B becomes high in level, a B transistor of the transistor array Q2 is turned on, and the parallel-connected resistors R12 and R15 and the resistor R13 are connected between the IPRGM terminal and the ground terminal of the charger IC (U2). Therefore, the charger IC (U2) outputs a predetermined constant voltage of 4.2V/750 mA. In the meantime, if the resistance of the ID resistor terminal (BAT_ID) is determined to be 1.5 kΩ, the output voltage of the comparator U1B and the voltage of the inverting input terminal of the comparator U1D become low in level, such that the resultant output level becomes high in level and all of the A and B transistors of the transistor array Q2 are turned on. From the viewpoint of an equivalent circuit between the IPRGM terminal and the ground terminal of the charger IC (U2), only parallel resistors R12 and R15 are connected to the charger IC (U2), such that the charger IC (U2) outputs a predetermined constant voltage of 4.2V/900 mA.

In accordance with the present invention, the voltage of the non-inverting terminal of the comparator U1A becomes lower due to the battery ID resistance so that the B transistor of the transistor array (Q1) is turned off. In this case, if a high-level voltage is applied to the EN-NTC terminal of the charger IC (U2), the charger IC (U2) outputs a high-level signal to a CHRGB terminal for the convenience of a user. Therefore, a green LED (L1) is turned off, and a transistor of the transistor array Q1 is turned on, such that the red LED (L2) is turned on. According to the aforementioned operation, the green LED (L1) is turned on in a charge standby mode, and a battery ID resistor is connected to the standard 24-pin connector when the terminal is connected to the standard 24-pin connector, such that the red LED (L2) is turned on to indicate a charging state. If the charging operation is performed and terminated as described above, the charging IC (U2) for controlling the charging operation drops the output voltage of the CHRGB terminal to a low-level voltage, and the green LED (L1) is turned on again such that it notifies a user of the end of the charging operation.

In accordance with the present invention, a 5th pin of the external USB port 105 of the PC is shielded in a main body to prevent peripheral noise from being generated during data communication, such that the present invention configures a detection circuit using the comparator U1C and one or more resistors. In more detail, the reference voltage is applied to the non-inverting input terminal of the comparator U1C, and the voltage of the inverting input terminal is changed with a connection state of the USB port 103 so that the output level of the comparator U1C is controlled. As a result, the transistor array Q3 is controlled by the output level of the comparator U1C, thereby controlling a current.

In more detail, if the external USB port 105 of the PC is connected to the USB port 103, $4^{th}$ and $5^{th}$ pins of the USB port 103 are connected to a shield terminal, and the resistor R18 is grounded via the shield terminal, such that the Vcc voltage is distributed to the resistors R5 and R18. The voltage applied to the resistor R18 is applied to the inverting input terminal of the comparator U1C. If the Vcc voltage is distributed to the resistors R19 and R20, the voltage applied to the resistor R20 is applied to the non-inverting input terminal of the comparator U1C.

In this case, the voltage applied to the resistor R20 is generated after passing through the resistor R19, and is higher than that of the resistor R18. Also, since one end of the resistor R5 is grounded by the resistor R18, the voltage of the non-inverting input terminal of the comparator U1C becomes higher than that of the inverting input terminal of the comparator U1C, and the output level of the comparator U1C becomes high in level. Therefore, the A and B transistors of the transistor array Q3 are turned on, so that the transistor array Q3 controls each output level of the comparators U1B and U1D to be a low level indicative of a ground level.

Accordingly, the transistors of the transistor array Q2 are turned off irrespective of a battery ID, so that serial- or parallel-connected resistors R12, R13, R14, and R15 are all connected between the IPRGM terminal and the ground terminal of the charger IC (U2), and the charger IC (U2) outputs a predetermined constant voltage of 4.2V/450 mA under the above condition, such that a charging operation can be stably performed in a small-capacity battery charging state. As a result, the present invention can charge the small-capacity battery using a power-supply source of the PC, and can also charge even a large-capacity battery at a relatively slow speed, such that it can perform stable and smooth data communication.

In the meantime, in the case where an external power-supply unit such as an adapter is connected to the charge-type data cable of the present invention, the USB port 106 of the power-supply unit is not shielded, so that the 4-th terminal of the USB port 103 is disconnected from the 5-th terminal of the USB port 103.

Therefore, one end of the resistor R18 is disconnected from the ground terminal, and a voltage of one terminal of the resistor R5 connected to the inverting input terminal of the comparator U1C is grounded by the resistor R18, so that there is no voltage drop in the voltage of one terminal of the resistor R5. As a result, the Vcc voltage is applied to the inverting input terminal of the comparator U1C without any change, so that the output level of the comparator U1C becomes low in level.

Therefore, the A and B transistors of the transistor array Q3 are not operated, and remain in off condition.

In this case, the transistors of the transistor array Q2 are selectively or simultaneously operated as described above according to the output states of the comparators U1B and U1D affected by the battery ID resistance, a connection state among the resistors R12, R13, R14, and R15 connected between the IPRGM terminal and the ground terminal of the charger IC (U2) is changed to another connection state, and a predetermined constant current is applied to the resistors R12, R13, R14 and R15 based on the changed connection state. Therefore, even if the battery is determined to be a large-capacity battery, a sufficient and optimum charge current capable of quickly charging the large-capacity battery is generated by the external power-supply unit.

Accordingly, the charge-type data cable of the present invention can use an additional external power-supply unit (having an output level based on the USB adapter format) capable of providing an additional sufficient charge current when the large-capacity battery is charged, and can be connected to the PC when data communication and a charging operation are all needed. The present invention automatically recognizes each power-supply source in the above two cases. If it is determined that the data cable is connected to the external power-supply unit, the data cable provides the battery with a sufficient current according to charge current capacity requested by the battery, such that a charging operation can be quickly and stably performed. Otherwise, if it is determined that the data cable is connected to the PC, the data cable provides the PC with a constant current so as to prevent a data communication failure from being generated, such that data communication and charging functions can be stably performed.

Therefore, if the power-supply source is determined to be the PC, the present invention performs a charging operation with a low current (405 mA±50 mA), irrespective of ID resistances (e.g., 27 kΩ, 4.5 kΩ, or 1.5 kΩ according to the TTA standard) in response to battery capacity. If the power-supply source is determined to be the power-supply unit, the present invention recognizes battery ID resistance so that it performs a charging operation with a charge current (e.g., 450 mA, 750 mA, or 900 mA±50 mA) suitable for the recognized battery capacity.

Accordingly, the terminal battery is charged with an optimum current during USB communication between the PC and the terminal, such that a communication failure during data transmission/reception is prevented from being generated, and a PC system failure caused by system errors and a PC rebooting operation are also prevented from being generated. When using the external power-supply unit, the battery is charged with a charge current based on the battery ID resistance, resulting in a rapid charging operation.

As apparent from the above description, the present invention automatically recognizes a power-supply source connected to a charge-type data cable, and adjusts a charge current in response to a recognized power-supply source, so that if can perform stable data communication and stable charging operations when a terminal is connected to a PC, and can perform a rapid charging operation when a terminal is connected to an external power-supply unit, resulting in greater convenience of use.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A charge-type data communication cable apparatus for automatically recognizing a power-supply source, the apparatus including a USB (Universal Serial Bus) port and a data port so that it performs data communication between a terminal and a personal computer (PC) and provides the terminal with a charge current, comprising:

a first comparator having an input connected to a USB ground terminal and a shield terminal of the USB port via a plurality of first resistors having different resistances;

a first transistor array switched in response to an output level of the first comparator;

second and third comparators, each of the second and third comparators having an inverting terminal connected to an ID resistor of a battery and a non-inverting terminal connected to a plurality of second resistors connected in series;

a second transistor array connected to output terminals of the second and third comparators; and a charger IC (Integrated Circuit) for providing the battery with a charge current, and including a predetermined input terminal connected to the second transistor array via a plurality of third resistors, wherein a third transistor array has output terminals connected to the output terminals of the second and third comparators.

* * * * *

UNITED STATES PATENT AND TRADEMARK OFFICE
CERTIFICATE OF CORRECTION

| | | |
|---|---|---|
| PATENT NO. | : 7,502,949 B2 | Page 1 of 1 |
| APPLICATION NO. | : 11/344885 | |
| DATED | : March 10, 2009 | |
| INVENTOR(S) | : Yoon Park | |

It is certified that error appears in the above-identified patent and that said Letters Patent is hereby corrected as shown below:

Title Page, after item 65, should read as follows:

RELATED U.S. APPLICATION DATA
-- Continuation of international application PCT/KR04/001910 filed on July 29, 2004. --

Signed and Sealed this

Twenty-first Day of April, 2009

JOHN DOLL
*Acting Director of the United States Patent and Trademark Office*